(12) United States Patent
Chen et al.

(10) Patent No.: US 10,430,369 B2
(45) Date of Patent: Oct. 1, 2019

(54) INTERFACE CARD MODULE AND ADAPTER CARD THEREOF

(71) Applicant: GIGA-BYTE TECHNOLOGY CO., LTD., New Taipei (TW)

(72) Inventors: Shih-Tse Chen, New Taipei (TW); Ching-Chuan Huang, New Taipei (TW); Chao-Hsiang Huang, New Taipei (TW)

(73) Assignee: GIGA-BYTE TECHNOLOGY CO., LTD., New Taipei (TW)

( * ) Notice: Subject to any disclaimer, the term of this patent is extended or adjusted under 35 U.S.C. 154(b) by 0 days.

(21) Appl. No.: 16/224,181

(22) Filed: Dec. 18, 2018

(65) Prior Publication Data

US 2019/0197005 A1 Jun. 27, 2019

(30) Foreign Application Priority Data

Dec. 25, 2017 (TW) .............................. 106145454 A

(51) Int. Cl.
*G06F 13/42* (2006.01)
*G06F 13/40* (2006.01)

(52) U.S. Cl.
CPC ........ *G06F 13/4221* (2013.01); *G06F 13/409* (2013.01); *G06F 13/4295* (2013.01); *G06F 2213/0026* (2013.01)

(58) Field of Classification Search
CPC .......................... G06F 13/4022; G06F 13/385
See application file for complete search history.

(56) References Cited

U.S. PATENT DOCUMENTS

| | | | | |
|---|---|---|---|---|
| 2011/0271029 A1* | 11/2011 | Ho | ......................... | G06F 13/385 710/313 |
| 2012/0033387 A1* | 2/2012 | Li | ........................... | G06F 1/185 361/730 |
| 2015/0087166 A1* | 3/2015 | Wu | ........................ | G06F 13/385 439/78 |
| 2015/0212961 A1* | 7/2015 | Wu | ..................... | G06F 13/4022 710/313 |
| 2017/0250481 A1* | 8/2017 | Zhu | ......................... | H01R 12/71 |

\* cited by examiner

*Primary Examiner* — Henry Tsai
*Assistant Examiner* — Christopher Daley
(74) *Attorney, Agent, or Firm* — Maschoff Brennan

(57) ABSTRACT

The disclosure is related to an interface card module which is configured to be inserted into a PCIe slot on a motherboard and to be inserted with a cable electrically connected to a function chip. The interface card module includes an adapter card and a function card. The adapter card includes a mainboard, a first PCIe male connector, a socket and at least one cable connector. The first PCIe male connector, the socket and the cable connector are respectively disposed on different sides of the mainboard. The first PCIe male connector is configured to be inserted into the PCIe slot on the motherboard. The at least one cable connector is inserted with the cable. The function card has a second PCIe male connector configured to be inserted into the socket of the adapter card. In addition, the disclosure is also related to an adapter card.

10 Claims, 3 Drawing Sheets

INTERFACE CARD MODULE AND ADAPTER CARD THEREOF

CROSS-REFERENCE TO RELATED APPLICATIONS

This non-provisional application claims priority under 35 U.S.C. § 119(a) on Patent Application No(s). 106145454 filed in Taiwan, R.O.C. on Dec. 25, 2017, the entire contents of which are hereby incorporated by reference.

TECHNICAL FIELD

The disclosure relates to a data transmission device, more particularly to an interface card module and an adapter card thereof.

BACKGROUND

The era of 'big data' has arrived as information and communication technology progresses. The facilities, such as servers, have to be able to handle a large amount of information on the internet in a timely manner. To do so, the data transmission speed among the servers is required to be increased.

Generally, data is transmitted by cables connected among servers, but in each server, the data transmission path between the network chip (e.g., PLX chip) and the network interface card (e.g., NIC) must go through circuit traces on a motherboard. Therefore, to transmit data from one server to another, the data has to be transmitted through the network chip, the circuit traces, a PCIe slot on the motherboard, and the network interface card. During this path, the signal has a large attenuation caused by the circuit traces on the motherboard, such that data requires much more time to be completely transmitted. As a result, the performance of the chip is unable to be completely exerted and the data transmission speed is largely decreased. Some manufacturers additionally install a signal booster in order to compensate for the attenuation of the signal, but the signal booster increases cost and is not effective for solving this issue.

SUMMARY

One embodiment of the disclosure provides an interface card module. The interface card module is configured to be inserted into a PCIe slot on a motherboard and to be inserted with a cable electrically connected to a function chip. In addition, the interface card includes an adapter card and a function card. The adapter card includes a mainboard, a first PCIe male connector, a socket and at least one cable connector. Besides, the first PCIe male connector, the socket and the cable connector are disposed on the mainboard, wherein the first PCIe male connector is configured to be inserted into the PCIe slot on the motherboard, and the at least one cable connector is configured to be inserted with the cable. Furthermore, the function card has a second PCIe male connector, wherein the function card is inserted into the socket of the adapter card.

Another embodiment of the disclosure provides an adapter card. The adapter card is configured to be insert into a PCIe slot on a motherboard, to be inserted with a function card, and to be inserted with a cable electrically connected to a function chip. Additionally, the adapter card includes a mainboard, a first PCIe male connector, a socket and at least one cable connector, wherein the first PCIe male connector, the socket and the at least one cable connector are disposed on the mainboard. Also, the first PCIe male connector is configured to be inserted into the PCIe slot on the motherboard, the socket is configured to be inserted with the function card, and the at least one cable connector is configured to be inserted with the cable.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

Figure 1:
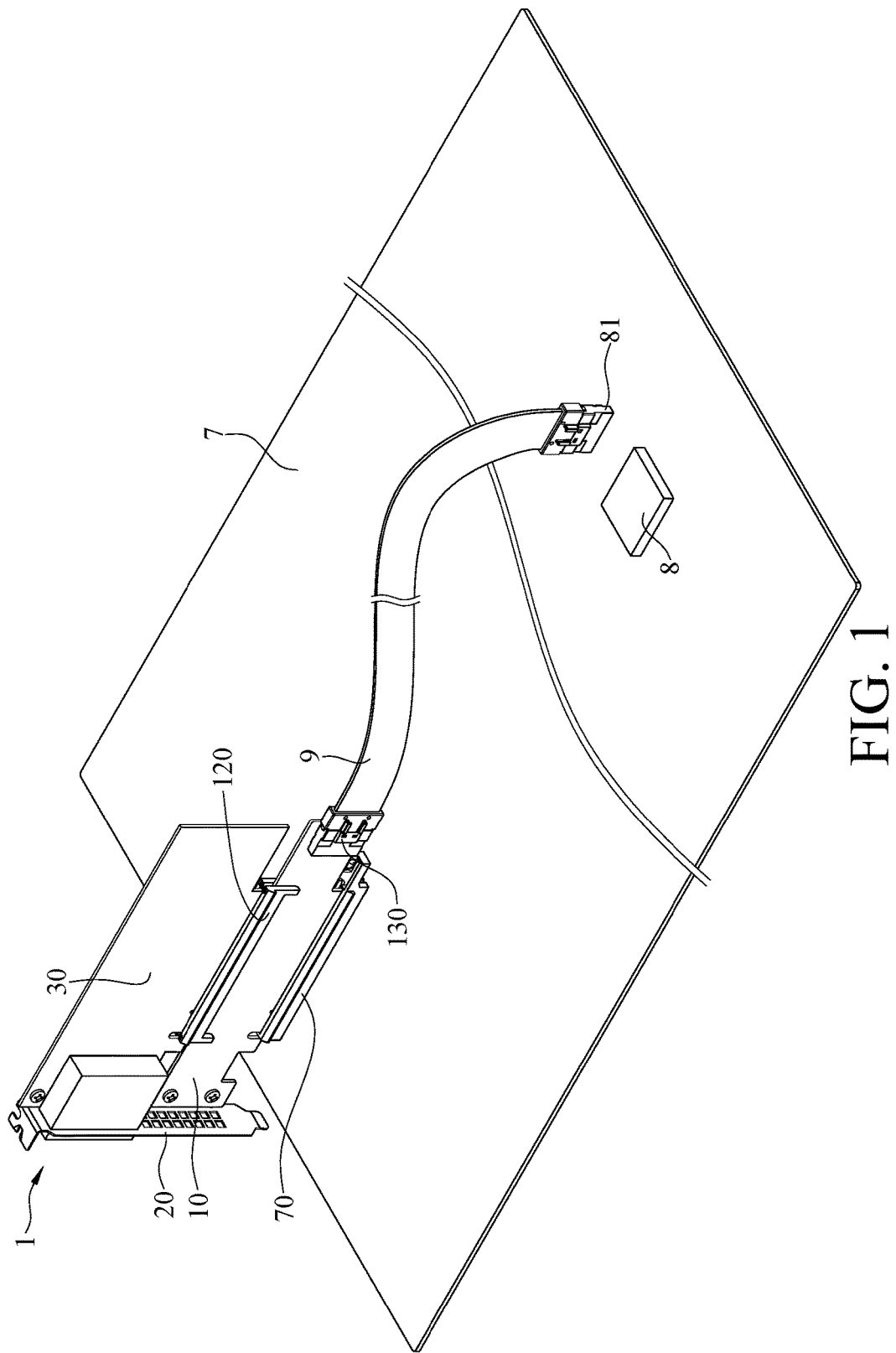
FIG. 1 is a schematic perspective view of an interface card module according to one embodiment of the disclosure disposed on a motherboard.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In addition, the embodiments in this disclosure are disclosed in the following drawings. For the specific illustration, the details of this disclosure are described in the following description. However, it should be understood that these practical details are not intended to limit this disclosure. Also, as a previously statement, for simplifying the drawings, some of the conventional structures and components are shown in the drawings in a simplified schematic manner in order to keep the drawings clarified.

Furthermore, unless there're other definitions, all terms used herein, including the technical and the scientific terms with the ordinary meaning, and said above terms are intended to be understood by the people with the ordinary skill in the prior art. Moreover, the definition of the above terms should be interpreted in this disclosure as the same meaning in the technical field related to this disclosure. Unless there's a specific definition, these terms are not to be described as the ideal or the regular meaning.

Please refer to FIG. 1, which is a schematic perspective view of an interface card module according to one embodiment of the disclosure disposed on a motherboard. This embodiment provides an interface card module 1 which is configured to be inserted into a slot 70 on a motherboard 7 and to be in signal communication with a function chip 8 located away from the slot 70. Additionally, the slot 70 is a PCIe slot. Also, there may be more than one slot 70 and some other electrical components disposed on the motherboard 7 that are electrically connected to the slots 70, but they are all omitted from the drawings in order to make the figures simple.

Figure 2:
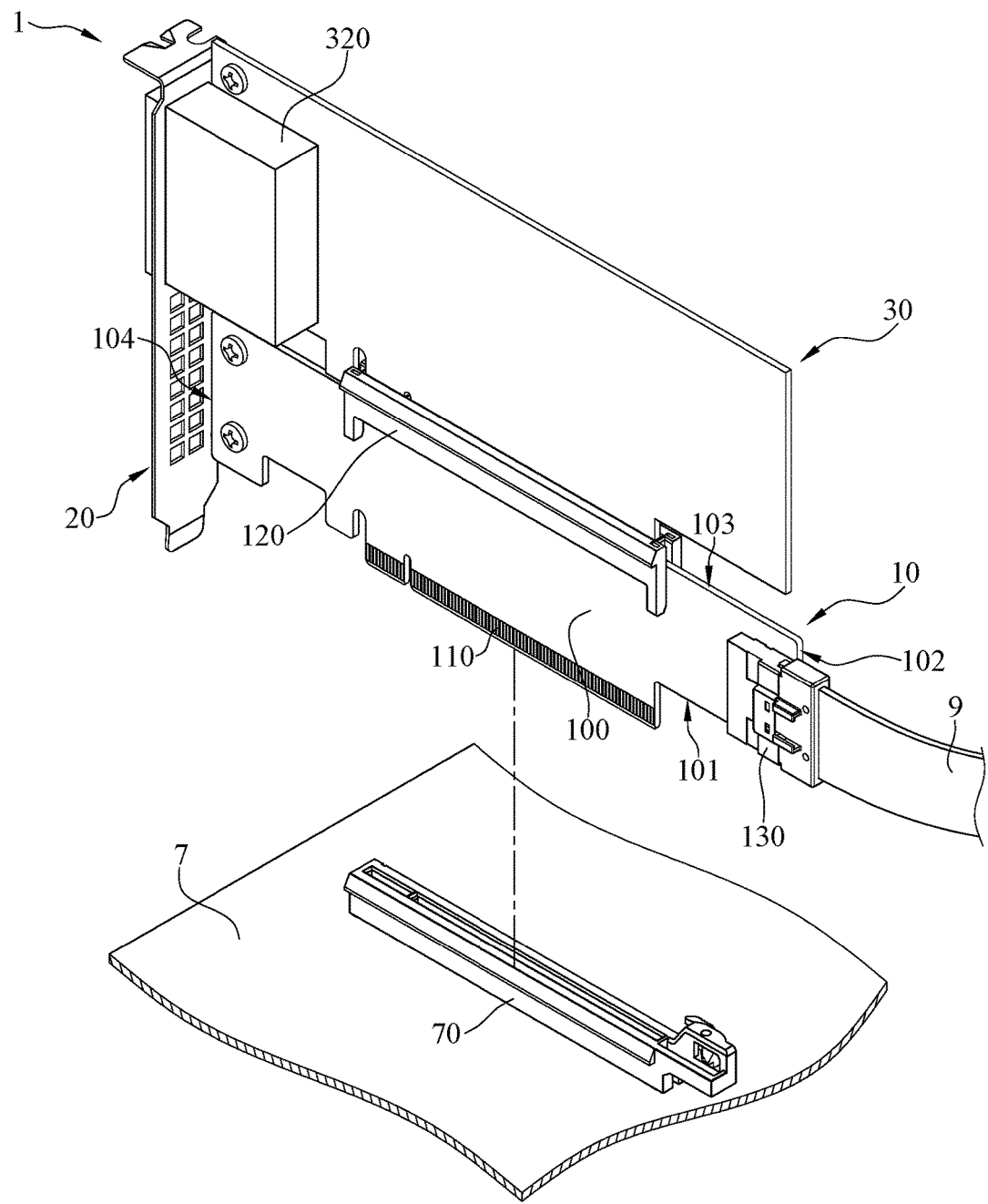
FIG. 2 is a perspective view of the interface card module in FIG. 1.
Figure 3:
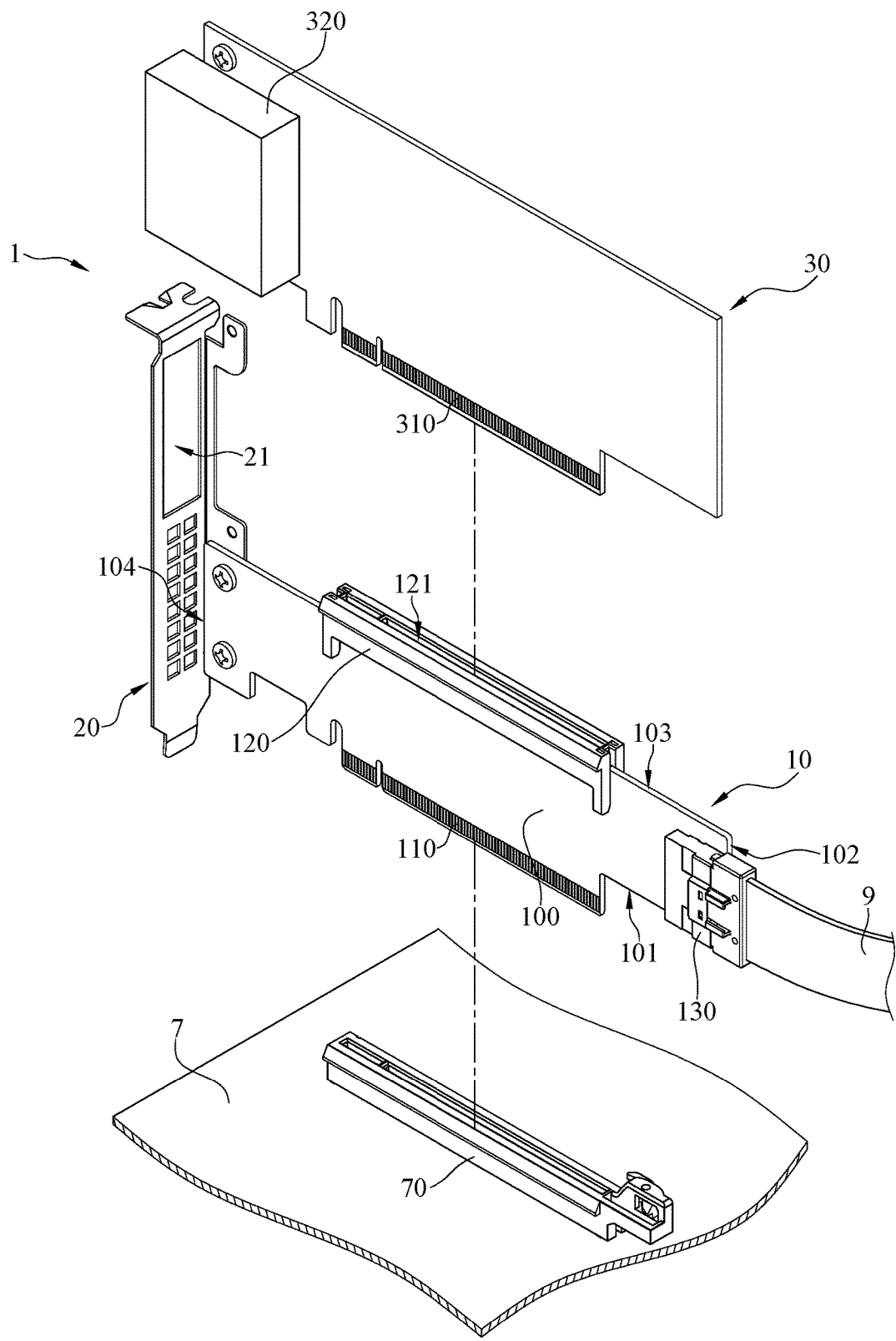
FIG. 3 is an exploded view of the interface card module in FIG. 1.

The detail descriptions of the interface card module 1 are provided hereinafter. Please refer FIG. 2 and FIG. 3, FIG. 2 is a perspective view of the interface card module in FIG. 1, and FIG. 3 is an exploded view of the interface card module in FIG. 1.

In this embodiment, the interface card module 1 includes an adapter card 10, a baffle 20 and a function card 30.

Specifically, the adapter card 10 includes a mainboard 100, a first PCIe male connector 110, a socket 120 and a cable connector 130. The mainboard 100 includes a first side 101, a second side 102, a third side 103 and a fourth side 104. The first side 101 and the third side 103 are located opposite to each other, and the second side 102 and the fourth side 104 are located opposite to each other. The first PCIe male connector 110 is disposed on the first side 101 of the mainboard 100. The first PCIe male connector 110 may be integrally formed with the mainboard 100, but the disclosure is not limited thereto. The socket 120 is disposed on the third side 103, and the socket 120 has an adapter slot 121. The cable connector 130 is disposed on the second side 102. As shown in the figures, the first PCIe male connector 110, the socket 120 and the cable connector 130 are respectively disposed on different sides of the mainboard 100 of the adapter card 10, and the first PCIe male connector 110 is located right under the adapter slot 121.

Moreover, the first PCIe male connector 110 is a PCIe express connector, and the PCIe slots 70 and the adapter slot 121 of the motherboard 7 are PCIe slots. The cable connector 130 is able to be inserted with a cable 9, and the other end of the cable 9 is configured to be electrically connected to the aforementioned function chip 8. In more detail, as shown in FIG. 1, the other end of the cable 9 is able to be inserted into a cable connector 81 that is located adjacent to the function chip 8 and is electrically connected to the function chip 8 via circuit traces (not shown in the figures) on the motherboard 7. It is understood that the cable connector 81 is a communication port to the function chip 8, but the disclosure is not limited to the cable connector 81, the function chip 8 and the cable 9 and the specifications thereof.

In addition, the socket 120 and the cable connector 130 are able to be electrically connected through the circuit traces (not shown in the figures) on the mainboard 100.

Furthermore, the amount of the cable connector 130 on a single adapter card 10 is not restricted. For example, in some other embodiments, there may be more than one cable connectors 130 disposed on a single adapter card.

The baffle 20 is fixed to the fourth side 104 of the adapter card 10 and is configured to be fixed to a computer casing (not shown in the figures). The baffle 20 is able to block dust from entering the computer casing and also able to fix the interface card module 1 in position so as to secure the connection between the first PCIe male connector 110 of the adapter card 10 and the PCIe slot 70 of the motherboard 7.

The function card 30 is, for example, a network interface card (NIC) or a raid card, but the disclosure is not limited thereto. The function card 30 has a second PCIe male connector 310. The second PCIe male connector 310 is also a PCIe express connector. The second PCIe male connector 310 is configured to be inserted into the adapter slot 121 of the adapter card 10. Furthermore, the function card 30 further has a port 320 disposed on a side of the function card 30 close to the baffle 20, and the baffle 20 has a hole 21. When the function card 30 is inserted into the adapter slot 121, the port 320 is exposed through the hole 21 of the baffle 20. It is noted that the amount of the port 320 on the function card 30 is not restricted. In addition, in the case that the function card 30 is a network interface card, the function chip 8 is a network chip. Furthermore, when the function card 30 is inserted into the adapter slot 121, the function card 30 is able to be fixed to the baffle 20 by screwing, thereby securing the connection between the second PCIe male connector 310 and the adapter slot 121 of the adapter card 10.

According to the interface card module discussed above, the function card 30 is able to be electrically connected to the cable 9 through the adapter card 10. Specifically, the function card 30 is able to be electrically connected to the cable 9 through the adapter slot 121, the circuit trace on the mainboard 100 and the cable connector 130. In such a case, as shown in FIG. 1, the transmission path between the function card 30 and the function chip 8 is implemented via the adapter card 10 and a cable (i.e., the cable 9) instead of the circuit traces (not shown in the figures) on the motherboard 7. Since the channel path of the cable 9 is wider than the circuit traces on the motherboard 7, the signal attenuation is largely decreased, such that the data transmission speed is improved, thereby shortening the time required for data transmission. As such, the signal booster is no longer needed, such that the cost may be reduced.

According to a result of the simulation of the interface card module of the disclosure, the data transmission speed may be increased at least 20%-30% by the interface card module 1 in this embodiment in comparison with the prior art that the signal is required to be transmitted through the circuit traces on the motherboard.

In addition, all the components shown in FIG. 1 may be accommodated in a server chassis (not shown), and the server chassis, generally, has much more available spaces in the height direction than the horizontal direction. Since the function card 30 is disposed above the adapter card 10, the interface card module 1 is able to occupy the available space for efficient utilization of the inner space of the server chassis.

According to the interface card module and the adapter card discussed above, since the adapter card has the adapter slot and the cable connector, the function card is able to be electrically connected to the function chip through the cable connector and the cable, which can prevent the signal attenuation caused by the circuit traces on the motherboard. Therefore, the quality is improved and the data transmission speed is increased, thereby shortening the time required for data transmission.

The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An interface card module configured to be inserted into a PCIe slot on a motherboard and to be inserted with a cable electrically connected to a function chip, and the interface card comprising:
   an adapter card having a mainboard, a first PCIe male connector, a socket and at least one cable connector, and the first PCIe male connector, the socket and the cable connector disposed on the mainboard, wherein the first PCIe male connector is configured to be inserted into the PCIe slot on the motherboard, and the at least one cable connector is configured to be inserted with the cable; and
   a function card having a second PCIe male connector, wherein the function card is inserted into the socket of the adapter card, and the socket for the insertion of the function card is located on a side of the mainboard opposite to the first PCIe male connector.

2. The interface card module according to claim 1, wherein the socket is electrically connected to the at least one cable connector through circuit traces on the mainboard.

3. The interface card module according to claim 1, wherein the first PCIe male connector, the socket and the cable connector are respectively disposed on different sides of the mainboard.

4. The interface card module according to claim 1, further comprising a baffle fixed on a side of the adapter card, and the at least one cable connector respectively disposed on another side of the adapter card opposite to the baffle.

5. The interface card module according to claim 4, wherein the function card has at least one port disposed on the side of the mainboard close to the baffle, the baffle has a hole, and the at least one port is exposed through the hole of the baffle.

6. The interface card module according to claim 1, wherein the function card is a network interface card or a raid card.

7. An adapter card configured to be insert into a PCIe slot on a motherboard, to be inserted with a function card, and to be inserted with a cable electrically connected to a function chip, and the adapter card comprising:

a mainboard, a first PCIe male connector, a socket and at least one cable connector, wherein the first PCIe male connector, the socket and the at least one cable connector are disposed on the mainboard;

wherein the first PCIe male connector is configured to be inserted into the PCIe slot on the motherboard, the socket is configured to be inserted with the function card, the socket for the insertion of the function card is located on a side of the mainboard opposite to the first PCIe male connector, and the at least one cable connector is configured to be inserted with the cable.

8. The adapter card according to claim 7, wherein the socket is electrically connected to the at least one cable connector through circuit traces on the mainboard.

9. The adapter card according to claim 7, wherein the first PCIe male connector, the socket and the cable connector are respectively disposed on different sides of the mainboard.

10. The adapter card according to claim 7, wherein a side of the motherboard is configured to be fixed to a baffle, and the at least one cable connector disposes on another side of the mainboard opposite to the baffle.

* * * * *